July 18, 1950    J. M. SIMPSON    2,515,270

SYNCHRONIZING TRANSMISSION

Filed June 26, 1946

Inventor:
John M. Simpson
By: Edward C. Gritzbaugh
Atty.

Patented July 18, 1950

2,515,270

UNITED STATES PATENT OFFICE 2,515,270

SYNCHRONIZING TRANSMISSION

John M. Simpson, Miami Beach, Fla., assignor to Borg-Warner Corporation, Chicago, Ill., a corporation of Illinois Application June 26, 1946, Serial No. 679,515

12 Claims. (Cl. 192—53)

This invention relates to improvements in transmission synchronizers, such as employed in change speed transmissions of motor vehicles to bring driving and driven power transmitting members to the same speed preparatory to drivingly interlocking the members by means of an axially movable positive drive control element.

More specifically, it is an object of the invention to provide a synchronizer transmission of the type wherein the synchronizing means comprises friction clutch elements adapted under axial thrust transmitted to one of such elements from the movable positive drive control element, to develop sufficient frictional engagement to cause the driving and driven power transmitting members to assume the same speed of rotation and prevent the positive drive control element connecting the members until such speed has been established, whereupon the thrust exerted upon the positive drive control element will permit said element to connect the members.

It is a further object of the invention to provide a synchronizing transmission as described, incorporating means for establishing a connection between the driving and driven members and including axially movable positive drive control elements in the form of a plurality of pins connected with a friction clutch element to one of the members and adapted to urge the friction clutch element into engagement with the friction clutch element secured to the other member to effect synchronism of the speeds of the members just prior to the pins establishing the positive drive connection between said members.

The present invention contemplates an arrangement wherein the friction clutch elements are urged into engagement by means of an expansible ring engageable by the axially movable positive drive pins to yieldingly urge the friction clutch members into engagement to obtain the desired synchronism of the driving and driven power transmitting members and thereafter flexing to permit the pins to positively connect the members.

Other objects, advantages and uses of the invention will become apparent from the following specification and claims, and after consideration of the drawing forming a part of this specification, wherein:

Figure 1:
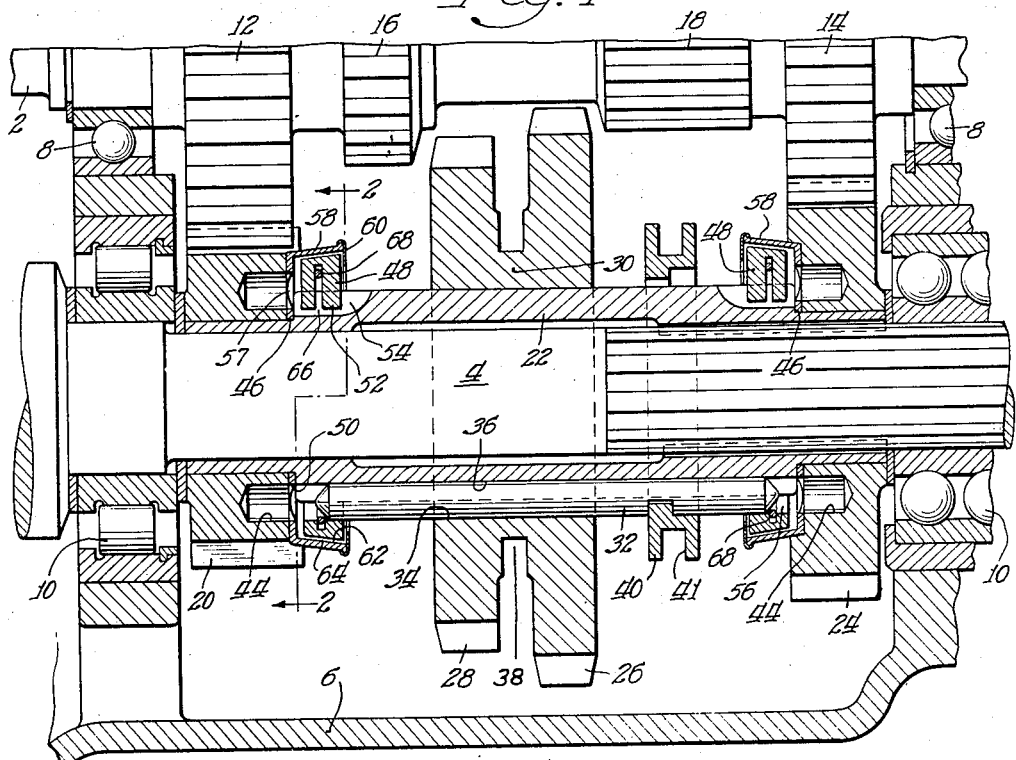
Fig. 1 is a fragmentary view partially in side elevation and partially in section through a motor vehicle transmission constructed in accordance with the invention, the section being taken substantially along the line 1—1 of Fig. 2.

Referring to the drawing, in Fig. 1 is shown a motor vehicle transmission comprising a drive shaft 2 and a driven shaft 4 mounted in a housing or transmission case 6. The drive shaft 2 is suitably journaled in the housing 6 as by the bearings 8, 8 and is driven from the vehicle engine through a conventional friction clutch mechanism (not shown). The driven shaft 4 is also suitably journaled in the housing 6 by means of the bearings 10, 10 and is adapted to be connected to the propeller shaft (not shown) to transmit drive thereto.

The drive shaft 2 is formed with a number of integral gears 12, 14, 16 and 18. Of these gears, the gear 12 is in constant mesh with the gear 20, which is mounted for rotation on one of the reduced ends of a sleeve 22 surrounding the driven shaft 4, and which has its opposite end splined thereto. The gear 14 is also in constant mesh with a gear 24, which is suitably journaled on the other reduced end of the sleeve 22. While the gears 20 and 24 are illustrated as being journaled on the sleeve 22, the gears may be journaled on the shaft 4, if desired.

Gears 18 and 16 constitute the first and second speed gears respectively and gear 18 is adapted to mesh with a gear 26 and the gear 16 is adapted to mesh with a gear 28. Both gears 26 and 28 are formed integrally with the gear hub 30 surrounding the sleeve 22 and connected to rotate with the sleeve 22 by means of four pins 32 spaced at equal distances apart from one another about the circumference of the sleeve and disposed parallel to the axis thereof, each pin being disposed in annular openings defined by the opposed arcuate grooves 34 and 36 in the gear hub 30 and the sleeve 22 respectively, whereby relative rotation of said sleeve and hub are prevented by the pins, while movement of the hub axially of the sleeve is permitted.

Sliding action of the gear hub 30 axially of the sleeve 22 for effecting meshing of the gears 26 and 28, carried by said hub, with the gears 16 and 18 respectively, is effected in the usual way by means of a shifter fork (not shown), which engages in a groove 38 in the body of the hub 30. Thus, in the illustrated embodiment of the invention, the gear hub 30 may be moved to mesh the gear 26 with the gear 18 to provide a first speed, or to mesh the gear 28 with the gears 16 to provide a second speed.

The transmission is also adapted to provide third and fourth speeds by connecting the constant mesh gears 24 and 20 respectively to the driven shaft 4. For this purpose, the pins 32 are connected together for conjoint axial movement by means of a ring 40 surrounding the sleeve 22 and disposed in radial coplanar slots in the pins 32, said ring 40 having a groove 41 receiving a shifter fork (not shown) for shifting the ring and thereby the pins 32 to selectively connect either the gear 20 or the gear 24 to effect the desired speed ratio. Third speed is obtained by movement of the ring 40 and thereby the pins 32 toward the constant mesh gear 24 and into four of the openings 44 therein to thereby lock the gear by the pins to the sleeve 22 rotatable with the driven shaft 4. To secure fourth speed, the pins 32 are moved toward the gear 20 and into four of the openings 44 therein for connecting the gear to the sleeve 22 splined to the driven shaft.

To perform these clutching operations just described without shock or clash, the invention provides synchronizing devices adapted to bring the driven shaft 4 and the gear 20 or the gear 24 to the same speed before positive engagement of the pins 32 with the gear selected to provide the desired speed. To this end, each synchronizing device comprises synchronizing clutch members 46 and 48, each of the gears 20 or 24 having fixed thereto the clutch member 46, and the adjacent portion of the sleeve 22 having slidably mounted thereon the member 48. Each clutch member 46 is in the form of an annular plate which fits over an adjacent reduced end of the sleeve 22 and is fitted within the side of the associated gear and suitably secured thereto, as by welding. The plate is provided with a plurality of openings 50 in alignment with the openings 44 in the gear to permit the passage of the pins into the gear to connect the gear to the driven shaft.

Figure 2:
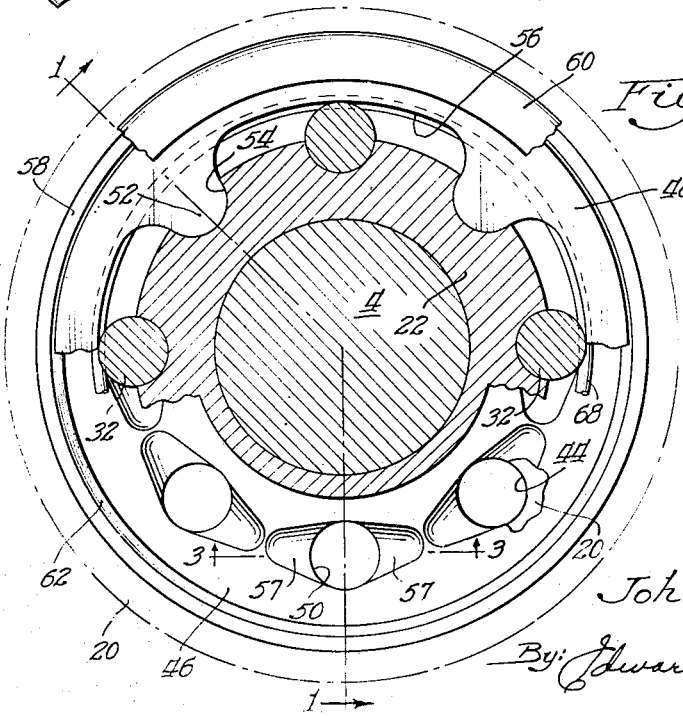
Fig. 2 is a sectional view along the line 2—2 of Fig. 1.
Figure 3:
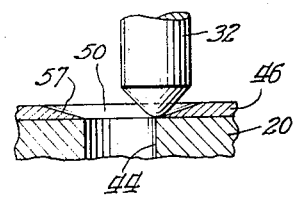
Fig. 3 is a view illustrating a positive drive pin and the formation of a portion of one of the gears to facilitate the connection of the positive drive pin thereto.

Each friction clutch member 48 surrounds the sleeve 22 and is in the form of a ring which is axially slidable but non-rotatably mounted on the sleeve 22 by means of drive lugs 52, 52 on the inner periphery of the ring fitting within spaces between the splines 54 on the adjacent portion of the sleeve 22 to hold the ring 48 against rotation on the sleeve 22, while permitting axial movement of the ring 48 relative to the sleeve toward the adjacent gear. The ring 48 is provided with four openings 56 within which are received the adjacent ends of the pins for guiding the pins into the aligned openings in the plate 46 and the gear attached thereto upon synchronization of the speeds of the driven shaft 4 with that of the selected gear. It may be noted from a consideration of Figs. 2 and 3, that the portion of the plate 46 fixed to the gear, has a chamfered area 57 surrounding each opening, which is instrumental in bringing the pins and openings in the plate into alignment to permit the ready and easy connection of the pin to the gear associated with the plate.

The plate 46 has an overhanging annular clutch portion or flange 58 extending toward and surrounding the clutch ring 48 and is provided at its outer extremity with a snap-on keeper plate 60 to prevent rearward movement of the ring 48. This flange 58 has a conical inner friction surface 62 adapted to coact with an external complementary conical friction surface 64 about the periphery of the ring 48. The plate 46 and ring 48 may be formed of any suitable material and I have found that if the plate be made of steel and the ring be made of brass, the frictional engagement of the plate and ring is considerably enhanced.

The ring 48 is formed with an annular radially extending groove or slot 66, within which is disposed a flexible expander ring 68, which may be formed of tempered steel and it may be noted that the ring partially projects within the openings 56 in the clutch ring 48 near the adjacent rounded ends of the pins for engagement with the pins during axial movement of the pins toward the adjacent gear to effect clutching engagement of the ring 48 and plate 46.

In the operation of each synchronizing device, and assuming the shift ring 40 and pins 32 associated therewith to be in a neutral position as shown in Fig. 1 and that the operator desires to shift the transmission into third speed, the shift ring is forced toward the right whereby the ends of the pins will contact the expander ring 68 to prevent passage of the pins through the openings in the ring 48 until the ring 68 is forced outwardly and expanded into the groove 66 in the clutch ring 48 whereby the ring 48 will be urged toward the right to frictionally engage the plate 46 to effect synchronization of the speed of the gear 24 and the shaft 4 just prior to the entry of the pins into the openings in the plate 46 and the gear 24. The driving gear 14, fixed to the shaft 2, will thereby transmit drive to the gear 24 by means of the pins and the sleeve splined to the driven shaft 4, to provide third speed.

The friction drive connection of the clutch plate 46, fixed to the gear 20, and the adjacent ring 48, splined to the sleeve 22, to secure synchronization of the speed of the gear 20, and sleeve 22, and thereby the drive and driven shafts 2 and 4, and the engagement of the constant mesh gear 20 by means of the pins, is effected in a similiar manner to that just described, the ring 40 in this case being moved to the left axially of the driven shaft 4 to connect the pins to the gear 20 to provide the fourth speed.

It will be apparent from the foregoing that I have provided a novel synchronizing transmission employing axially shiftable elements for positively drivingly connecting the driving and driven members and also synchronizing devices for effecting the ready connection of the elements in an arrangement which is relatively simple and inexpensive in construction, has a minimum of parts which may be readily manufactured, and is easy to assemble and which is sure in operation. Also, that by the employment of shifting pins in the transmission, as described, the overall length of the transmission is considerably shortened as compared to other positive means for effecting a connection between driven and driving power transmitting shafts.

While this invention has been described in detail in its present form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. In a synchronizing transmission, a torque-transmitting shaft, a sleeve surrounding said shaft and fixed thereto, spaced gears rotatably mounted and axially fixed on said sleeve, a plurality of pins between said gears and carried by and rotatable with said sleeve, means for shifting said pins axially of said sleeve toward one or the other of said gears and into openings therein for establishing a positive drive connection between the engaged gear and said shaft, a synchronizer element adjacent each gear and surrounding said sleeve for rotation therewith, a friction clutch element on each of said gears and engageable with a friction surface on the adjacent synchronizer element, said synchronizer element being axially movable into frictional driving engagement with the friction clutch element on the adjacent gear so as to establish a friction drive connection between said gear and shaft, said synchronizing element having openings therein for slidably receiving said pins and having a radial slot extending therearound communicating with said openings, and expandible spring means in said slot and extending into said last-mentioned openings and engageable by said pins during the axial movement thereof by said shifting means toward the adjacent gear to urge said synchronizer element into frictional engagement with the friction clutch element on the adjacent gear and thereafter expanding said spring means into said slot to permit passage of said pins into the openings in the adjacent gear.

2. In a synchronizing transmission, a torque-transmitting shaft, a sleeve surrounding said shaft and fixed thereto, torque-transmitting members rotatably mounted and axially fixed on said sleeve, a plurality of pins between said members and carried by and rotatable with said sleeve, means for shifting said pins axially of said sleeve toward one or the other of said members and into openings therein for establishing a positive drive connection between the engaged member and said shaft, a friction clutch element on each member, a synchronizer element adjacent each member and surrounding said sleeve for rotation therewith, said synchronizer element being axially movable into frictional driving engagement with the friction clutch element on the adjacent member so as to establish a friction drive connection between said member and shaft, said synchronizing element having openings therein for slidably receiving said pins and having a radial slot extending therearound communicating with said openings, and expandible spring means in said slot and extending into said last-mentioned openings and engageable by said pins during the axial movement thereof by said shifting means toward the adjacent member to urge said synchronizer element into frictional engagement with the friction clutch element on the adjacent member and thereafter expanding said spring means into said slot to permit passage of said pins into the openings in the adjacent member.

3. In a synchronizing transmission, a torque-transmitting shaft, a sleeve surrounding said shaft and fixed thereto, torque-transmitting members rotatably mounted and axially fixed on said sleeve, said members including positive clutch means and friction clutch means, a plurality of positive clutch elements between said members and carried by and rotatable with said sleeve, means for shifting said positive clutch elements axially of said sleeve toward one or the other of said members and into engagement with the positive clutch means thereof for establishing a positive drive connection between the engaged member and said shaft, a synchronizer element adjacent each member and surrounding said sleeve for rotation therewith, said element being axially movable into frictional driving engagement with the friction clutch means of the adjacent member so as to establish a friction drive connection between said member and shaft, said synchronizing element having openings therein for slidably receiving said positive clutch elements and having a radial slot extending therearound communicating with said openings, and expandible spring means in said slot and extending into said last-mentioned openings and engageable by said positive clutch elements during the axial movement thereof by said shifting means toward the adjacent member to urge said synchronizer element into frictional engagement with the friction clutch means of the adjacent member and thereafter expanding said spring means into said slot to permit passage of said positive clutch elements and engagement with the positive clutch means of the adjacent member.

4. In a synchronizing transmission, a torque-transmitting shaft, a sleeve surrounding said shaft and fixed thereto, spaced gears rotatably mounted and axially fixed on said sleeve, a plurality of pins between said gears and carried by and rotatable with said sleeve, means for shifting said pins axially of said sleeve toward one or the other of said gears and into openings therein for establishing a positive drive connection between the engaged gear and said shaft, a synchronizer element adjacent each gear and surrounding said sleeve for rotation therewith, a friction clutch element on each of said gears and engageable with a friction surface on the adjacent synchronizer element, said synchronizer element being axially movable into frictional driving engagement with the friction clutch element on the adjacent gear so as to establish a friction drive connection between said gear and shaft, said synchronizing element having openings therein for slidably receiving said pins, and spring means in the openings in said synchronizing element and engageable by said pins during axial movement thereof by said shifting means toward the adjacent gear to urge said synchronizer element into frictional engagement with the friction clutch element on the adjacent gear and thereafter yielding to permit passage of said pins into the openings in the adjacent gear.

5. In a synchronizing transmission, a torque-transmitting shaft, a sleeve surrounding said shaft and fixed thereto, torque-transmitting members rotatably mounted and axially fixed on said sleeve, a plurality of pins between said members and carried by and rotatable with said sleeve, means for shifting said pins axially of said sleeve toward one or the other of said members and into openings therein for establishing a positive drive connection between the engaged member and said shaft, a synchronizer element adjacent each member and surrounding said sleeve for rotation therewith, a friction clutch element on each member and engageable with a friction surface on the adjacent synchronizer element, said synchronizer element being axially movable into frictional driving engagement with the friction clutch element on the adjacent member so as to establish a friction drive connection between said member and shaft, said synchronizing element having openings therein for slidably receiving said pins, and spring means in the openings in said synchronizing element and engageable by said pins during axial movement thereof by said shifting means toward the adjacent member to urge said synchronizer element into frictional engagement with the friction clutch element on the adjacent member and thereafter yielding to permit passage of said pins for engagement with the adjacent torque-transmitting element.

6. In a synchronizing transmission, a torque-transmitting shaft, a sleeve surrounding said shaft and fixed thereto, spaced gears rotatably mounted and axially fixed on said sleeve, a plurality of pins between said gears and carried by and rotatable with said sleeve, means for shifting said pins axially of said sleeve toward one or the other of said gears and into openings therein for establishing a positive drive connection between the engaged gear and said shaft, a synchronizer element adjacent each gear and surrounding said sleeve for rotation therewith, a friction clutch element fixed to each gear and engageable with a friction surface on the adjacent synchronizer element, said synchronizer element being axially movable into frictional driving engagement with the friction clutch element fixed to the adjacent gear so as to establish a friction drive connection between said gear and shaft, and spring means carried by said synchronizing element and actuable by said pins during axial movement of said pins toward the adjacent gear for urging said synchronizing element into frictional engagement with the friction clutch element fixed to the adjacent gear and thereafter yielding to permit said pins to move into the openings in the adjacent gear.

7. In a synchronizing transmission, a torque-transmitting shaft, a sleeve surrounding said shaft and fixed thereto, torque-transmitting members rotatably mounted and axially fixed on said sleeve, a plurality of pins between said members and carried by and rotatable with said sleeve, means for shifting said pins axially of said sleeve toward one or the other of said members and into openings therein for establishing a positive drive connection between the engaged member and said shaft, a synchronizer element adjacent each member and surrounding said sleeve for rotation therewith, friction clutch means carried by each member and engageable with a friction surface on the adjacent synchronizer element, said element being axially movable into friction driving engagement with the friction clutch means carried by the adjacent member so as to establish a friction drive connection between said latter member and shaft, and spring means carried by said synchronizing element and rendered operative by said pins during axial movement of said pins toward the adjacent member for urging said synchronizing element into frictional engagement with the friction clutch means on the adjacent member and thereafter yielding to permit said pins to move into the openings in the adjacent member.

8. In a synchronizing transmission, a shaft, a member surrounding said shaft and fixed thereto, a gear rotatable on said shaft and having axially extending openings therein, a plurality of pins carried by said member for rotation therewith and axially movable relative thereto for reception in said gear openings for establishing a positive drive connection between said gear and shaft, friction clutch means carried by said gear, a synchronizing element carried by said member and adapted to be shifted axially thereof into frictional driving engagement with said friction clutch means, said synchronizing element having openings therein receiving said pins and having a radial slot therein communicating with said openings, spring means in said slot and extending within said last-mentioned openings for engagement with said pins to urge said synchronizing element into frictional engagement with said friction clutch means and thereafter expanding to permit passage of said pins into the openings in said gear.

9. In a synchronizing transmission, a pair of torque-transmitting members in axial alignment, positive drive means and friction clutch means on one of said members, a sleeve drivingly fixed to the other of said members, a plurality of positive drive elements carried by said sleeve and movable axially thereof into positive drive engagement with the positive drive means on said one of said members, a friction clutch element mounted on said sleeve and axially shiftable into frictional driving engagement with the friction clutch means on said one member to establish a friction drive connection between said members, and radially movable means carried by said axially shiftable friction clutch element and disposed in the path of said first-mentioned elements for engagement with the latter during axial shifting thereof to urge said axially shiftable friction clutch element into engagement with said friction clutch means and thereafter being adapted to be radially moved to permit passage of said first-mentioned elements for engagement with the positive drive means of said one member.

10. In a synchronizing transmission, a shaft, a torque-transmitting member rotatably mounted and axially fixed on said shaft, said member including positive drive means, a support member encircling said shaft and drivingly connected thereto, a plurality of positive drive elements rotatable with said support member and free to move axially relative thereto into engagement with said positive drive means, a friction clutch member axially movable relative to said support member and adapted to rotate therewith, a friction clutch member fixed to said torque-transmitting member and engageable by said axially movable friction clutch member to establish a friction drive connection between said shaft and torque-transmitting member, and resilient means carried by said first-mentioned friction clutch member and adapted for engagement by said positive drive elements during axial movement thereof toward said torque-transmitting member to cause said first-mentioned friction clutch member to be moved axially into frictional engagement with said second-mentioned friction clutch member and thereafter yielding to permit the engagement of said positive drive elements with the positive drive means of said torque-transmitting member.

11. In a synchronizing transmission, a shaft, a gear rotatably mounted and axially fixed on said shaft, positive drive means carried by said gear, a member encircling said shaft and drivingly connected thereto, drive elements mounted within said member for rotation therewith and axially shiftable thereof for engagement with the positive drive means carried by said gear to establish a positive drive connection between said shaft and gear, a friction clutch member fixed to said gear, a friction clutch element rotatable with said first-mentioned member and axially shiftable into engagement with the friction clutch member fixed to said gear, said clutch element having openings therein guidingly engaging said drive elements, and spring means carried by said clutch element and adapted to yieldingly resist movement of said drive elements for urging said clutch element into engagement with said clutch member and thereafter yielding to permit engagement of said drive elements with the positive drive means carried by said gear.

12. In a synchronizing transmission, a shaft, a gear rotatably mounted and axially fixed on said shaft and including positive drive means, a member encircling said shaft and drivingly connected thereto, positive drive elements mounted within said member for rotation therewith and axially shiftable thereof for engagement with the positive drive means of said gear to establish a positive drive connection between said shaft and gear, a friction clutch element fixed to said gear, a friction clutch element rotatable with said member and axially shiftable into engagement with said friction clutch element fixed to said gear, said axially shiftable clutch element having openings therein guidingly engaging said drive elements, means for axially shifting said drive elements toward said gear, and means interposed in the path of movement of said drive elements for urging said axially shiftable clutch element into frictional engagement with said fixed clutch element prior to the engagement of said drive elements with the positive drive means of said gear.

JOHN M. SIMPSON.

REFERENCES CITED

The following references are of record in the file of this patent:

UNITED STATES PATENTS

| Number | Name | Date |
|---|---|---|
| 918,610 | Tschantz | Apr. 20, 1909 |
| 1,611,617 | Tuerck | Dec. 21, 1926 |
| 1,909,644 | Wescott | May 16, 1933 |
| 1,913,162 | Keller | June 6, 1933 |
| 2,096,770 | Wagner | Oct. 26, 1937 |
| 2,256,320 | Lapsley | Sept. 16, 1941 |
| 2,338,428 | Guter | Jan. 4, 1944 |
| 2,345,250 | Fishburn | Mar. 28, 1944 |

FOREIGN PATENTS

| Number | Country | Date |
|---|---|---|
| 203,731 | Great Britain | Sept. 10, 1923 |
| 798,955 | France | May 29, 1936 |